J. RAU.
STANCHION AND TRIP LEVER.
APPLICATION FILED MAR. 13, 1911.
1,020,710.
Patented Mar. 19, 1912.
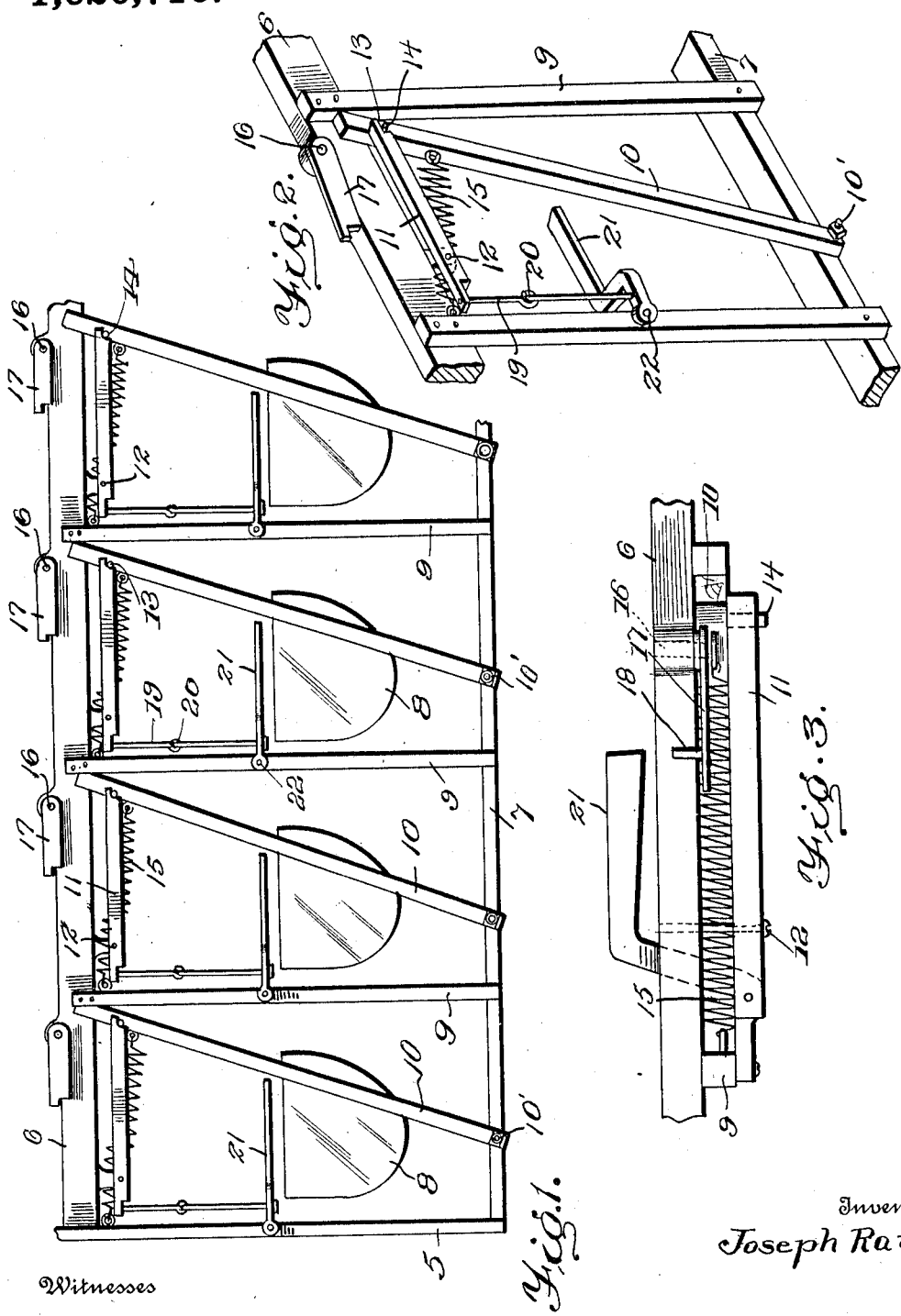
Inventor
Joseph Rau.

UNITED STATES PATENT OFFICE.

JOSEPH RAU, OF FAYETTE, IOWA, ASSIGNOR OF ONE-HALF TO FRANK RAU, OF FAYETTE, IOWA.

STANCHION AND TRIP-LEVER.

1,020,710.  Specification of Letters Patent.  Patented Mar. 19, 1912.

Original application filed January 7, 1911, Serial No. 601,358. Divided and this application filed March 13, 1911. Serial No. 614,100.

*To all whom it may concern:*

Be it known that I, JOSEPH RAU, citizen of the United States, residing at Fayette, in the county of Fayette and State of Iowa, have invented certain new and useful Improvements in Stanchions and Trip-Levers, of which the following is a specification.

This invention relates to stanchions.

The object of the invention is to provide a stanchion of simple and durable construction adapted to be placed in front of a feed trough so that when a calf or other animal attempts to eat from said trough, the stanchion will be actuated to hold the animal until released by an attendant.

A further object of the invention is to provide a stanchion having a trip lever operatively connected therewith and actuated by contact with the neck of an animal to automatically close said stanchion.

A still further object of the invention is generally to improve this class of devices, so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawing, in which:

Figure 1 is a front elevation, showing a gang of stanchions constructed in accordance with the present invention; Fig. 2 is a perspective view of one of the stanchions detached; Fig. 3 is a top plan view of Fig. 2.

Corresponding and like parts are referred to in the following description and indicated in all the views of the drawing by the same reference characters.

The stanchions are mounted on a supporting frame 5 including spaced end bars connected by upper and lower longitudinal bars 6 and 7, one of said stanchions being preferably disposed in front of each trough 8, as shown. Each stanchion comprises a stationary member or bar 9 having its upper and lower ends rigidly secured to the bars 6 and 7 and a movable member or bar 10, the lower end of which is pivotally mounted at 10' on the lower bar 7, as best shown in Fig. 1 of the drawing.

The movable member 10 of each stanchion is normally held in open position by means of a latch bar 11 pivotally mounted at 12 on the upper connecting bar 6 and having its free end provided with a notch 13 adapted to bear against a pin 14 extending laterally from the outer face of the adjacent movable member 10 at the upper end thereof, there being a coil spring 15 interposed between the stationary and movable members of each stanchion for automatically moving the members 10 to closed position when the latch bars 11 are released.

Arranged above each feed trough 8 and pivotally mounted at 16 on the connecting bar 6, is a locking member 17 adapted to engage the upper end of the adjacent movable member 10 when the latch bar 11 is released, thus to hold said movable member in closed position and prevent the withdrawal of the head of an animal from within the stanchion. Each locking member 17 is provided with a laterally extending pin 18 which bears against the upper edge of the connecting bar 6 and serves to hold said locking member in the path of movement of the adjacent movable member 10.

Depending from the latch bar 11 of each stanchion, on one side of the pivot pin 12, is a rod 19, preferably formed of pivotally united sections having their inner ends provided with interengaging loops or eyes 20 and to one of which sections is connected a trip lever 21. One end of each trip lever 21 is pivotally mounted at 22 on the adjacent stationary member 9, while the other end thereof is extended inwardly over the adjacent feed trough 8, so that as a calf or other animal inserts its head within the stanchion, in an attempt to eat from the trough 8, the neck of the animal will depress the trip lever 21 and through the medium of the rod 19, release the latch bar 11, thereby to cause the spring 15 to move the member 10 of the stanchion to closed position, and in which position, it will be held by the locking member 17 so as to prevent the animal from withdrawing its head from the stanchion until the locking member 17 is released by the operator or other attendant. By such a construction, a number of calves or other animals may be fed at one time, each calf feeding from a separate trough without interference on the part of the other animals.

Having thus described the invention, what is claimed as new is:

1. A device of the class described including a frame, a stanchion secured to the frame and including relatively stationary and movable members, a latch bar normally engaging the movable member, a spring forming a connection between the stationary and movable members of the stanchion, a rod depending from one end of the latch bar, a trip lever pivotally mounted on the stationary member and operatively connected with the rod, said trip lever being actuated by contact with the neck of an animal to release the latch bar, and a locking device pivotally mounted on the frame for holding the movable member of the stanchion in closed position.

2. A device of the class described including a frame, a stanchion mounted on the frame and including relatively movable and stationary members, a pin extending laterally from the movable member, a spring forming a connection between said members, a latch bar engaging the pin of the movable member for normally holding the latter in open position, a rod depending from the latch bar and formed of pivotally united sections, a trip lever pivotally mounted on the stationary member of the stanchion and operatively connected with the lower section of the rod, the free end of the trip lever being actuated by contact with the neck of an animal to release the latch bar, a locking member pivotally mounted on the frame and adapted to engage and hold the movable member of the stanchion in closed position, and a pin extending laterally from the locking member and adapted to engage said frame for holding the locking member in normal position.

3. A device of the class described comprising a frame including upper and lower longitudinal bars, stanchions mounted on the longitudinal bars of the frame and each including stationary and movable members, a pin projecting laterally from the outer face of the movable member at the upper end thereof, a latch bar pivotally mounted on the upper longitudinal bar of the frame at each stanchion and adapted to engage the pin of the movable member of the adjacent stanchion for holding the latter in open position, means operatively connected with one end of each latch bar and actuated by contact with the neck of an animal to release said latch bar, and a locking member disposed above each latch bar and adapted to engage the movable member of the adjacent stanchion for locking said movable member in closed position.

4. A device of the class described including a frame, a stanchion mounted on the frame and including stationary and movable members, a pin projecting laterally from the outer face of the movable member, a latch bar pivotally mounted on the frame and having its free end provided with a notch adapted to engage the pin of the movable member of the stanchion, a spring forming a connection between the stationary and movable members of the stanchion, a sectional rod depending from the pivoted end of the latch bar, a trip lever connected with the lower section of the rod and having one end thereof pivotally mounted on the stationary member of the stanchion and its other end bent inwardly, said trip lever being actuated by contact with the neck of an animal to release the latch bar, and a locking member pivotally mounted on the frame and adapted to engage the movable member of the stanchion for holding the latter in closed position.

In testimony whereof, I affix my signature in presence of two witnesses.

JOSEPH RAU. [L. S.]

Witnesses:
WINCE RAU,
GLEN FISH.

---

Copies of this patent may be obtained for five cents each, by addressing the "Commissioner of Patents, Washington, D. C."